US009892407B2

(12) United States Patent
Russell (10) Patent No.: US 9,892,407 B2
(45) Date of Patent: Feb. 13, 2018

(54) METHOD AND SYSTEM FOR SECURE USER IDENTIFICATION

(71) Applicant: Swivel Secure Limited, West Yorkshire (GB)

(72) Inventor: Chris Russell, West Yorkshire (GB)

(73) Assignee: Swivel Secure Limited, West Yorkshire (GB)

( * ) Notice: Subject to any disclaimer, the term of this patent is extended or adjusted under 35 U.S.C. 154(b) by 526 days.

(21) Appl. No.: 14/403,001

(22) PCT Filed: Apr. 29, 2013

(86) PCT No.: PCT/GB2013/051088
§ 371 (c)(1),
(2) Date: Nov. 21, 2014

(87) PCT Pub. No.: WO2013/178982
PCT Pub. Date: Dec. 5, 2013

(65) Prior Publication Data
US 2015/0134526 A1    May 14, 2015

Related U.S. Application Data

(60) Provisional application No. 61/660,395, filed on Jun. 15, 2012.

(30) Foreign Application Priority Data

May 28, 2012  (GB) .................................. 1209404.1

(51) Int. Cl.
*G06F 15/16*  (2006.01)
*G06Q 20/38*  (2012.01)
(Continued)

(52) U.S. Cl.
CPC ............ *G06Q 20/385* (2013.01); *G06F 21/31* (2013.01); *G06F 21/36* (2013.01); *G06F 21/46* (2013.01);
(Continued)

(58) Field of Classification Search
CPC .. G06Q 20/385; G06Q 20/4014; G06F 21/46; G06F 21/36; G06F 21/31; H04L 9/3228; G07F 7/1041
See application file for complete search history.

(56) References Cited

U.S. PATENT DOCUMENTS

| 7,392,388 B2 | 6/2008 | Keech |
| 2003/0182558 A1 | 9/2003 | Lazzaro et al. |

(Continued)

FOREIGN PATENT DOCUMENTS

WO    2008080228 A1    7/2008

OTHER PUBLICATIONS

Great Britain Search and Examination Report from counterpart GB Application No. GB1209404.1, dated Aug. 31, 2012, 18 pp.
(Continued)

*Primary Examiner* — Mohammed Waliullah
(74) *Attorney, Agent, or Firm* — Patterson Thuente Pedersen, P.A.

(57) ABSTRACT

There is disclosed a method and system for verifying an identity of a user to a computer system. The user is assigned a user access code in the form of an invariant string of integers from 0 to 9, with length no greater than ten. The user access code is stored in the computer system; the computer system generates a ten-digit random or pseudo-random non-repeating string of the integers 0 to 9, the string having 1st to 10th positions each with a unique integer and having respective positional values 1 to 10; and the computer system performs a predetermined algorithm to combine the
(Continued)

user access code and the random or pseudo-random string, thereby to determine a one-time verification code in the form of a string of the same length as the user access code. The computer system also generates 1st to 10th cells, the cells having respective locational values 1 to 10; populates the cells with the integers of the non-repeating string such that the locational value of each cell corresponds to the integer it contains combined with the random or pseudo-random string using the same predetermined algorithm as used previously; and displays the cells on a display. A user uses an input device of the computer system to select, in order, the cells on the display that contain the integers constituting the user access code. Each act of selection returns the locational value of the selected cell, thereby to generate a one-time transaction code comprising a string of integers from 0 to 9 having the same length as the user access code. The computer system then compares the verification code with the one-time transaction code and makes a successful identity verification if the verification code matches the one-time transaction code.

20 Claims, 2 Drawing Sheets (51) Int. Cl.
*G06F 21/31* (2013.01)
*G06Q 20/40* (2012.01)
*G07F 7/10* (2006.01)
*H04L 9/32* (2006.01)
*G06F 21/36* (2013.01)
*G06F 21/46* (2013.01)

(52) U.S. Cl.
CPC ....... *G06Q 20/4014* (2013.01); *G07F 7/1041* (2013.01); *H04L 9/3228* (2013.01)

(56) References Cited

U.S. PATENT DOCUMENTS

| | | |
|---|---|---|
| 2004/0243854 A1 | 12/2004 | Lee |
| 2006/0053301 A1 | 3/2006 | Shin |
| 2006/0242421 A1 | 10/2006 | Hsu |
| 2011/0060912 A1 | 3/2011 | Dai |
| 2013/0159196 A1* | 6/2013 | DiZoglio ............... G06Q 20/20 705/72 |

OTHER PUBLICATIONS

International Search Report and Written Opinion for corresponding PCT Application No. PCT/GB2013/051088, dated Sep. 5, 2013 (11 pgs.).

* cited by examiner

Figure 1

Random/pseudo-random string: 5094382716

User access code: 2468

Verification code: 0487

METHOD AND SYSTEM FOR SECURE USER IDENTIFICATION

PCT/GB2013/051088, filed Apr. 29, 2013, which claims the benefit of Great Britain Application No. 1209404.1, filed May 28, 2012 and U.S. Application No. 61/660,395, filed Jun. 15, 2012. The entire contents of each of PCT Application No. PCT/GB2013/051088, Great Britain Application No. 1209404.1, and United States Application No. 61/660,395 are incorporated herein by reference.

The present invention relates to a method and system for authenticating a user to a computer system by way of a Personal Identification Number (PIN) or passcode.

BACKGROUND

In today's world, financial and other transactions are often conducted by way of the Internet, with banks and other institutions providing online Web-based account access for their customers. In order to access his/her account, a customer typically identifies him/herself on a webpage by entering a unique customer identifier (which is not secret), and subsequently entering a PIN or passcode or password (which must be kept secret and is known only to the customer and to the computer system that the customer is trying to access).

A weakness of existing systems is that the computer being used by the customer to access the bank's computer system may have been infected with malware, in particular keystroke loggers, which can record the keystrokes made by the customer when accessing his/her account. The keystroke logger can then transmit the logged keystrokes to a third party, who can then access the customer's bank account without difficulty by using the unique customer identifier and PIN/passcode/password combination.

Another problem is that of "shoulder surfing", where a person standing near another person using an ATM, a code entry door lock or an EPOS (Electronic Point of Sale) keypad in a shop can easily determine a PIN that is being entered. It is also known for thieves to tamper with ATMs by installing card skimmers and small video cameras to capture PIN entry, or for dishonest shopkeepers to skim cards and note down customers' PIN codes as these are entered on EPOS keypads.

Efforts have been made to reduce this problem, for example by requiring that a customer does not use keystrokes to enter his/her PIN, but instead uses screen-based interfaces employing a mouse, pointer and drop-down menus, or a touch-screen interface. While the use of a mouse and pointer, for example, can overcome the threats posed by keystroke loggers, there are more sophisticated malware programs that can detect the position of a pointer on a screen, and hence can deduce the data being entered if an interface with a fixed virtual keypad is employed.

Examples of improved interfaces are known from U.S. Pat. No. 6,549,194, where a device for entry of a PIN is provided with a touch screen, and wherein a numerical keypad is displayed on the touch screen for a user to enter his/her PIN. In order to hinder keystroke loggers or similar malware, the touch screen display is configured to change the layout of the numerical keypad between uses, so that malware will not be able to determine which number is represented in any given transaction by the portion of the touch screen that is activated.

US 2004/0225601 discloses an ATM or POS (Point-Of-Sale) device where a user inserts his/her bank card and then enters a PIN in the usual manner. The user is then prompted to enter a second PIN or security code, this time using keys of the ATM or POS that are not normally used for entering numbers. Instructions are displayed on the screen to show the user which keys correspond to which numbers.

U.S. Pat. No. 7,992,007 presents a virtual keypad on a display screen for a user to enter a PIN by clicking on the virtual keys with a mouse-controlled pointer. The size, layout and geometry of the virtual numeric keypad and of the keys making up the keypad are changed each time to hinder malware that detects the position of a pointer on a screen.

It is known from U.S. Pat. No. 7,392,388 in the name of the present Applicant (the entire content of which is hereby incorporated into the present application by way of reference) to provide an identity verification system in which a user can identify himself to a bank or merchant computer or the like by applying a relatively simple protocol to a challenge string received from the bank or merchant computer by way of an SMS message, or a secure website by way of a Hypertext Transfer Protocol Secure (HTTPS) connection, or an email communication or the like. The user is in possession of a short numerical code, analogous to a typical Personal Identification Number (PIN) commonly used as a security measure together with a credit or debit card. This numerical code, which may be four digits in length (although other lengths may be used), is known only to the user and to the bank or card issuer. The user applies the numerical code to a pseudorandom security string issued by the bank or card issuer, by selecting characters from the security string, on a positional basis determined by each digit of the numerical code, taken in order. For example, where a user numerical code is "2473", and the pseudorandom security string is "396&fty7d3GG9", the user would return "9&y6", with "9" being the second ($2^{nd}$) character in the security string, "&" being the fourth ($4^{th}$) character, "y" being the seventh ($7^{th}$) character and "6" being the third ($3^{rd}$) character.

As an alternative to selecting characters from a security string on a positional basis by way of a numerical code, the user may do so on the basis of applying a secret shape or pattern to an array of security digits (rather like a Cardan grille), although computationally the method is similar to that described above.

A special advantage of the type of encryption disclosed in U.S. Pat. No. 7,392,388 is that it is relatively simple for a user to apply mentally, although an applet or small application running on a mobile device owned by the user could also be used, while still being reasonably secure. In particular, assuming sufficient redundancy in the pseudorandom security string, it is not easy for a third party to deduce the user's PIN or numerical code, even if both a pseudorandom security string and a returned response from the user are hijacked.

It is also known, for example from US 2011/0060912, to input a password by way of a touch-sensitive display. A password array having a plurality of characters is displayed, the characters being arranged in a first order. The system detects if a permutating signal is received, and generates a password array having a plurality of characters in a second order. In other words, the system comprises a touch-screen PIN entry interface where the keys of the number pad can be shifted around pseudorandomly upon receipt of a permutating signal, which may be a user input or may be issued automatically after each key input.

BRIEF SUMMARY OF THE DISCLOSURE

In accordance with a first aspect, there is provided a method of verifying an identity of a user to a computer system, the user being assigned a user access code in the form of an invariant string of integers from 0 to 9, with length no greater than ten; comprising:

i) storing the user access code on the computer system;

ii) the computer system generating a ten-digit random or pseudo-random non-repeating string of the integers 0 to 9, the string having $1^{st}$ to $10^{th}$ positions each with a unique integer and having respective positional values 1 to 10;

iii) the computer system performing a predetermined algorithm to combine the user access code and the random or pseudo-random string, thereby to determine a one-time verification code in the form of a string of the same length as the user access code;

iv) the computer system generating $1^{st}$ to $10^{th}$ cells, the cells having respective locational values 1 to 10;

v) the computer system populating the cells with the integers of the non-repeating string such that the locational value of each cell corresponds to the integer it contains combined with the random or pseudo-random string using the same algorithm as used in step iii);

vi) the computer system displaying the cells on a display;

vii) the user using an input device of the computer system to select, in order, the cells on the display that contain the integers constituting the user access code, wherein each act of selection returns the locational value of the selected cell, thereby to generate a one-time transaction code comprising a string of integers from 0 to 9 having the same length as the user access code;

viii) the computer system comparing the verification code with the one-time transaction code; and ix) a successful identity verification being made if the verification code matches the one-time transaction code.

In accordance with a second aspect, there is provided a system for verifying an identity of a user to a computer system, the user being assigned a user access code in the form of an invariant string of integers from 0 to 9, with length no greater than ten; the computer system being configured to:

i) store the user access code in a memory;

ii) generate a ten-digit random or pseudo-random non-repeating string of the integers 0 to 9, the string having 1st to 10th positions each with a unique integer and having respective positional values 1 to 10;

iii) perform a predetermined algorithm to combine the user access code and the random or pseudo-random string, thereby to determine a one-time verification code in the form of a string of the same length as the user access code;

iv) generate 1st to 10th cells, the cells having respective locational values 1 to 10;

v) populate the cells with the integers of the non-repeating string such that the locational value of each cell corresponds to the integer it contains combined with the random or pseudo-random string using the same algorithm as used in step iii);

vi) display the cells on a display;

vii) receive input from the user, the user using an input device of the computer system to select, in order, the cells on the display that contain the integers constituting the user access code, wherein each act of selection returns the locational value of the selected cell, thereby to generate a one-time transaction code comprising a string of integers from 0 to 9 having the same length as the user access code;

viii) compare the verification code with the one-time transaction code; and ix) to make a successful identity verification if the verification code matches the one-time transaction code.

In a basic implementation, for example, embodiments of the invention would allow a user to access a building or open a locked door by typing in a user access code in step vii). The fact that the user types in the correct access code is considered sufficient to identify that the user is an authorized user. Multiple users would all use the same access code. This is analogous to a traditional combination lock, which can be opened by anyone who is in possession of the combination code. The advantage of the present method is that a user would activate different keys each time the user access code is entered, and this helps to reduce the risk of shoulder surfing.

In more sophisticated implementations, each user is assigned a user identity. This might be, for example, a bank account number or other ID number that might be stored on a card (for example in a magnetic strip or an integrated circuit or chip), or on an ID badge or stored in a portable electronic device such as a mobile phone. This allows each user to have his own user access code, and requires a user to identify himself by providing his user identity together with the associated user access code, since this combination will be unique for each user. The computer system will have stored in its memory both the user identity (most likely together with other user information, such as name, address and other details) and the user access code, and the user needs to provide both his user identification and his user access code to gain access to the system. The particular user access code entry method of embodiments of the present invention seeks to provide a more secure way for the user to input his user access code than the traditional direct entry method.

The user need not have knowledge of the predetermined algorithm that is used to generate the verification code and to populate the cells with the integers of the random or pseudorandom string. Indeed, preferred embodiments seek to provide a secure method of generating a one-time transaction code and corresponding verification code in a manner that is almost transparent to the user, thus facilitating use of the system and method.

In one embodiment, the algorithm may operate as follows. The computer system determines a verification code in a manner similar to that disclosed in U.S. Pat. No. 7,392,388, namely by taking the first digit of the user access code, selecting the integer at the corresponding position in the random or pseudo-random string, and returning this integer as the first digit of the verification code. The same process is repeated for the second, third etc. digits of the user access code, thus generating a verification code that has the same length as the user access code, but with different integers making up the code.

In order to populate the cells with the integers of the random or pseudo-random string, the computer system determines the position of integer "1" in the string, and places the positional value of the position of integer "1" in the $1^{st}$ cell; determines the position of integer "2" in the string, and places the positional value of the position of integer "2" in the $2^{nd}$ cell; determines the position of integer "3" in the string, and places the positional value of the position of integer "3" in the $3^{1d}$ cell; and so forth up to determining the position of integer "0" in the string, and placing the positional value of the position of integer "0" in the $10^{th}$ cell.

When the user views the display, the integers 1, 2, 3, 4, 5, 6, 7, 8, 9 and 0 are displayed, for example in an array corresponding to a traditional numeric keypad, but they will not be in the traditional order (unless, by chance, the random or pseudorandom string is "1234567890" for a telephone style keypad, taking top left as position 1 and the bottom as position 10). However, when the user selects the integers making up his user access code from the displayed keypad array, the one-time transaction code that is actually input to the computer system comprises the corresponding locational values of the digits of the user access code which, because of the algorithm used to populate the cells, will correspond to the verification code (assuming a correct code entry). It is to be appreciated that this provides a significant difference over systems such as that disclosed in US 2011/0060912, which do not carefully populate the cells in one permutation only (for each random or pseudo-random string) in accordance with a predetermined algorithm so that when the user enters his user access code, the one-time transaction code that is actually input to the computer system is based on the locations values of the cells, not the contents of the cells. This has the subtle, but important consequence that the one-time transaction code is automatically identical to the verification code.

The algorithm may instead be applied the other way around. The verification code may be determined by taking the positional value in the random or pseudorandom string of the first digit of the user access code; then taking the positional in the random or pseudorandom string of the second digit of the user access code; and so forth to generate a verification code of the same length as the user access code. The cells are then populated by putting the first digit of the string in the $1^{st}$ cell, the second digit in the $2^{nd}$ cell and so forth. Accordingly, when the user selects the digits of his user access code from the displayed cells, he will return the locational values of the selected cells, which will form a one-time transaction code that corresponds to the verification code.

Other algorithms may be used, for example an "add n" algorithm where the locational value of each digit in the random or pseudo-random string corresponds to the value of the digit plus n (modulo 10). For best security, the value of n may be random or pseudorandom and change from one transaction to the next.

It will be understood that there are any number of algorithms that may be used, provided that they generate an appropriate one-to-one correspondence allowing a verification code to be generated from the random or pseudo-random string combined with the user access code, and to allow an identical one-time transaction code to be generated by a user selecting digits from cells that have been populated on the basis of the same algorithm and operands.

The input device may be a touch screen, or may be a pointer controlled by a mouse, trackball, trackpad, cursor keys or other control device. What is important is that the input device allows the contents of the cells to be displayed in a manner that will change between transactions by changing the non-repeating permutation of the digits from 0 through to 9. Preferably, the input device is such as to prevent keystroke loggers from being able to determine data being input by the user, and also to hinder a shoulder surfer or hidden camera from determining which keys are being pressed on the basis of hand or finger movements.

The content of the cells may be displayed as a regular array of predetermined dimensions. For example, the array may be represented as a conventional numerical keypad with the digits 0 to 9 each represented once. The array may be a 2×5 or 5×2 or 3×3+1 or honeycomb or other arrangement, for example as shown in U.S. Pat. No. 6,549,194. However, unlike a conventional keypad, the displayed numbers can change each time the keypad is displayed. This means that it is difficult if not impossible for malware to determine which numbers are selected even if the position of the pointer can be determined.

Alternatively, the array of characters may be presented as an irregular array, provided that each position in the array has a unique positional identifier. The arrangement of the irregular array may be changed between successive identity verifications, for example as shown in U.S. Pat. No. 7,992,007. Alternatively or in addition, the positions of elements of the array on the display may be arranged differently on successive applications of the method.

The display and input device may be associated with a computer terminal in communication with a host computer to which the user wishes to gain access. The computer terminal may be a user's home computer, or a public computer in an internet café or hotel, an ATM, an EPOS machine, a mobile handset or tablet or any other appropriate device.

The host computer may define the arrangement and content of the array of characters displayed on the display of the computer terminal.

The method and system may be used for identifying a user to a computer system by way of a web page, or by way of an ATM or EPOS device, or any other interface where an array of characters can be displayed on a display and where a user can select appropriate digits in sequence, the selection being input to the computer system. The method and system is not limited to identifying a user to a financial institution such as a bank, but in any situation where a user has a user identity code and an associate user access code (for example a PIN or password) that must be kept secret and is known only to the user and to the computer system of the issuing organisation.

A particular advantage is that the user's secret user access code is never itself input into the computer system, but instead is translated into the positional identifiers automatically by the selection process. This provides an additional layer of security over and above the pointer- or touch screen-based input mechanism.

BRIEF DESCRIPTION OF THE DRAWINGS

Embodiments of the invention are further described hereinafter with reference to the accompanying drawings, in which.

DETAILED DESCRIPTION

Figure 1:
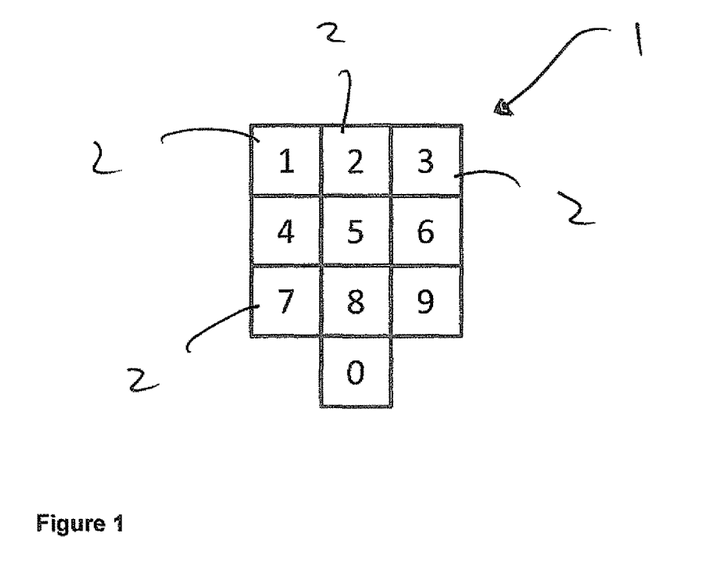
FIG. 1 shows a representation of a standard numerical keypad comprising an array of cells.

FIG. 1 shows a representation of a typical numerical keypad 1 comprising an array of cells 2. The cells 2 are non-repeatingly populated with the digits 0 up to 9. The configuration shown is similar to that of a telephone keypad. Other standard configurations might be as found on a calculator or computer keyboard, with 9 at the top left and 3 at the bottom right. In the embodiment shown, each cell 2 has a locational value, with the digit "1" being in the cell with locational value 1, the digit "2" being in the cell with locational value 2, and so forth up to digit "0" being in the cell with locational value 10.

Supposing that a user has a user access code "2468". The computer system is configured to generate a ten-digit random or pseudo-random non-repeating string of the integers 0 to 9, for example "5094382716". This string will be different for each transaction. In order to generate a verification code, the computer combines the user access code "2468" with the non-repeating string "5094382716" by taking the $2^{nd}$, $4^{th}$, $6^{th}$ and 8th digits from the non-repeating string. This generates a verification code "0487" (the length of the verification code is the same as that of the user access code).

The computer system also determines which digit needs to be placed in which cell 2 of the keypad 1 for the authentication process. In the present example, because digit "1" is the $9^{th}$ digit in the string "5094382716", the digit "9" will be placed in the cell with locational value 1. Digit "2" is the $7^{th}$ digit in the string, and so the digit "7" will be placed in the cell with locational value 2. Digit "3" is the $5^{th}$ digit in the string, and so the digit "5" will be placed in the cell with locational value 3. This continues up to digit "0" which is the $2^{nd}$ digit in the string, with the digit 2 being placed in the cell with locational value 10.

Figure 2:
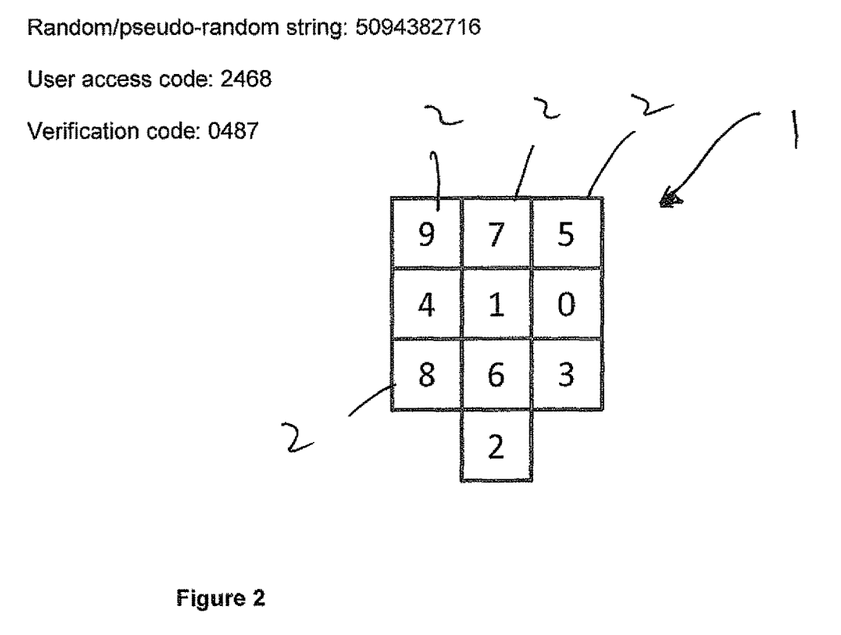
FIG. 2 shows a representation of the keypad of FIG. 1, but with the cells populated by digits from a random or pseudo-random non-repeating string.

FIG. 2 shows the cells 2 of the keypad 1 populated with the digits of the random or pseudo-random non-repeating string "5094382716" as described in the preceding paragraph. When the user is presented with this keypad 1, he will enter the user access code by selecting the displayed digits "2", "4", "6" and "8" in order. This will return a one-time transaction code in the form of a string comprising the locational values of the cells 2 containing these digits, namely "0487" (it will be understood that locational value "10" in the cells and the positional value "10" in the random or pseudo-random string corresponds to a value 0 in the user access code and verification code in the illustrated embodiment).

Thus, if and only if a user successfully enters the correct user access code, a one-time transaction code "0487" is returned that automatically matches the verification code "0487".

Figure 3:
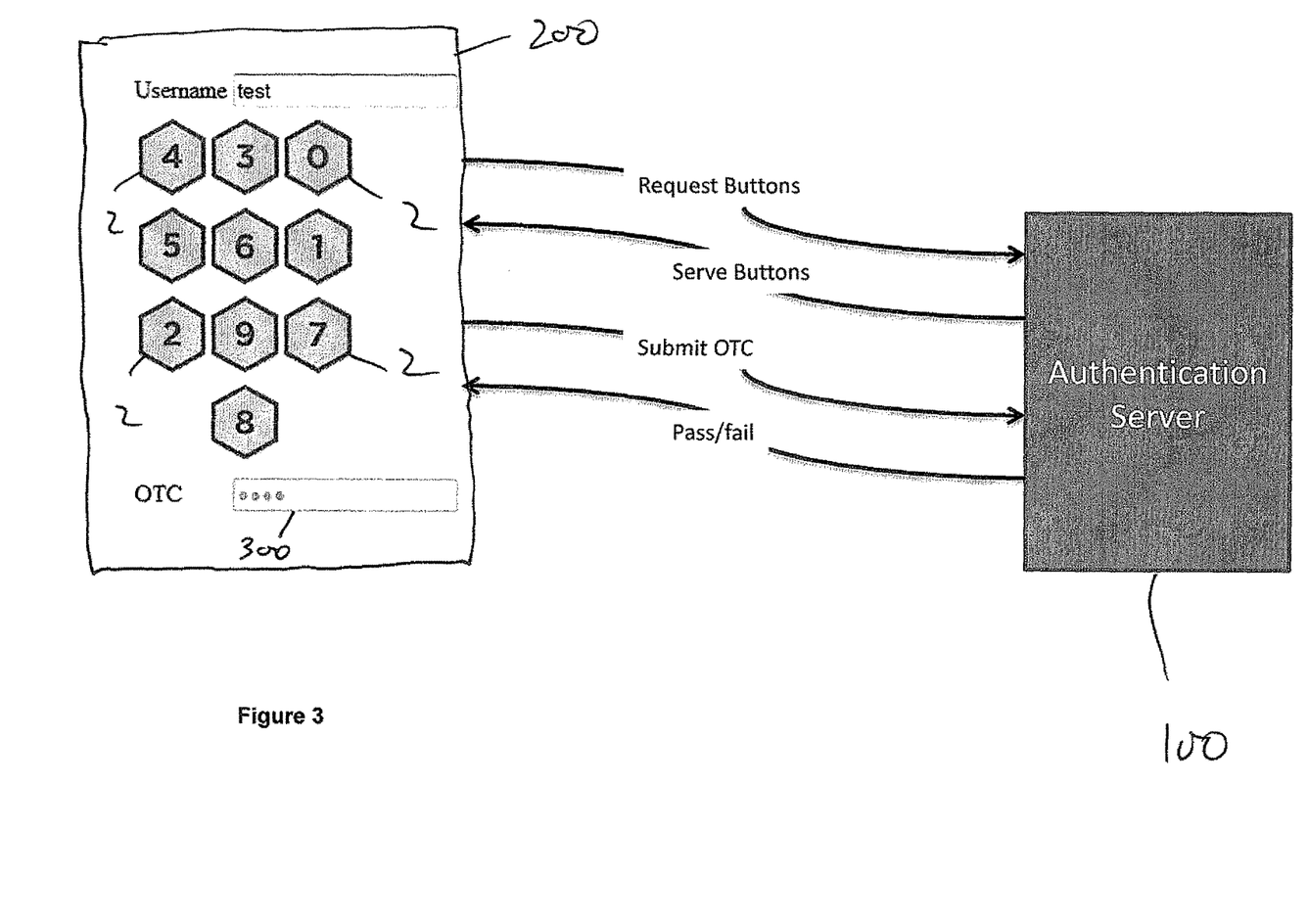
FIG. 3 shows a basic architecture of an embodiment of the invention.

FIG. 3 shows a typical system architecture for an embodiment of the invention, where an authentication server 100 communicates with a display 200 of a computer device (not shown). The display 200 may be a touch screen display, or may be a display where the cells 2 can be selected with an input device such as a mouse and pointer. A user (not shown) identifies himself though a login form by entering his unique user identity (here "test"). The user identity is transmitted to the authentication server 100, where the user identity is used to look up the associated user access code. A random or pseudo-random non-repeating permutation of the digits 0 to 9 is generated, and this is combined with the user access code to generate a verification code. In addition, the cells 2 of the display 200 are populated non-repeatingly with the digits 0 to 9 on the basis of the user access code and the random or pseudo-random permutation as previously discussed.

The user then selects the digits of his user access code on the display 200 so as to return the locational values of the cells 2 containing the relevant digits, thereby generating a one-time transaction code that is returned to the authentication server 100 by way of dialogue box 300. The authentication server 100 compares the one-time transaction code with the verification code, and if these are the same, it grants access to the user.

The login form is easy to implement within standard web-technologies, notably html and JavaScript. For example, the keypad can be implemented as a table, with each cell having a click event that adds its position to the credentials field of the form, although it will be appreciated that the keys or buttons can be placed in any position on the page.

```
function addOtc(digit){
    var otc;
    otc = document.getElementById("otc");
    otc.value = otc.value + digit;
}
.
.
.
<table>
<tr>
<td onclick=addOtc("1")>
<img id="1"></img>
</td>
.
.
.
<tr>
<td>OTC</td><td><input type = "password" disabled="disabled"
id="otc"></input></td>
</tr>
```

To display the grid, the form requests the images from the authentication server 100. The form supplies a username and a sessionkey. A different security string is created for every sessionkey

```
function getButtons( ){
    var name,n,sessionKey;
    sessionKey = + Math.ceil(10000*Math.random( ));
    name = document.getElementById("username").value;
    for(n = 1; n<=10; n++){
        img = document.getElementById("" + n);
        img.src = serverurl + name + "&padno=" +
sessionKey + ":" + n ;
    }
}
```

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of verifying an identity of a user to a computer system, the user being assigned a user access code in the form of an invariant string of integers from 0 to 9, with length no greater than ten; comprising:
   i) storing the user access code in the computer system;
   ii) the computer system generating a ten-digit random or pseudo-random non-repeating string of the integers 0 to 9, the string having $1^{st}$ to $10^{th}$ positions each with a unique integer and having respective positional values 1 to 10:
   iii) the computer system selecting integers from the random or pseudo-random non-repeating string on a positional basis determined by the integer values of the integers of the user access code, taken in positional order, thereby to determine a one-time verification code in the form of a string of the same length as the user access code, with integer value 1 corresponding to positional value 1, integer value 2corresponding to positional value 2 and so forth, with integer value 0 corresponding to positional value 10;
   iv) the computer system generating $1^{st}$ to $10^{th}$ cells, the cells having respective locational values 1 to 10;
   v) the computer system populating the cells with the integers of the non-repeating string such that the value of the integer in each cell corresponds to the positional value in the random or pseudo-random string of the integer representing the locational value of the cell, with integer value 1 corresponding to positional value 1, integer value 2 corresponding to positional value 2 and so forth, with integer value 0 corresponding, topositional value 10:
   vi) the computer system displaying the cells on a display;
   vii) the user using an input, device of the computer system to select, in order, the cells on the display that contain the integers constituting the user access code, wherein each act of selection returns the locational value of the selected cell, thereby to generate a one-time transaction code comprising a string of integers from 0 to 9 having the same length as the user access code;
   viii) the computer system comparing the verification code, with the one-time transaction code; and
   ix) a successful identity verification being made if the verification code matches the one-time transaction code.

2. The method according to claim 1, wherein each user is assigned a unique user identity.

3. The method according to claim , wherein the compute system stores each user identity in association with the user's user access code.

4. The method according to claim 1, wherein the input device is a touch screen.

5. The method according to claim 1, wherein the input device is a pointer controlled by a mouse, trackball, trackpad, cursor keys or other control device.

6. The method according to claim 1, wherein the cells ares displayed as a regular array of predetermined dimensions.

7. The method according to claim 1, wherein the cells are displayed as an irregular array.

8. The method according to claim 1, wherein the positions of the cells on the display are arranged differently on successive applications of the method.

9. The method according to claim 1, wherein the display and input device are associated with a computer terminal in communication with a host computer to which the user wishes to gain access.

10. The method according to claim 9, wherein the host computer defines the arrangement and content of the cells displayed on the display of the computer terminal.

11. A system comprising a computer system for verifying an identity of a user, the user being assigned a user access code in the form of an invariant string of integers from 0 to 9, with length no greater than ten, the computer system being configured to:
   i) store the user access code in a memory;
   ii) generate a ten-digit random or pseudo-random non-repeating string of the integers 0 to 9, the string having $1^{st}$ to $10^{th}$ positions each with a unique integer and having respective positional values 1 to 10;
   iii) select integers from the random or pseudo-random non-repeating string on a positional basis determined by the integer values of the integers of the user access code, taken in positional order thereby to determine a one-time verification code in the form of a string of the same length as the user access code with integer value 1 corresponding to positional value 1, integer value 2 corresponding to positional value 2 and so forth, with integer value 0 corresponding to positional value 10;
   iv) generate to $1^{st}$ to $10^{th}$ cells, the cells having respective locational values 1 to 10;
   v) populate the cells with the integers of the non-repeating string such that the value of the integer in each cell corresponds to the positional value in the random or pseudo-random string of the integer representing the locational value of the cell, with integer value 1 corresponding to positional value 1, integer value 2 corresponding to ,positional value 2 and so forth, with integer value 0 corresponding to positional value 10;
   vi) display the cells on a display;
   vii) receive input from the user, the user using an input device of the computer system to select, in order, the cells on the display that contain the integers constituting the user access code, wherein each act of selection returns the locational value of the selected cell, thereby to generate a one-time transaction code comprising a string of integers from 0 to 9 having the same length as the user access code;
   viii) compare the verification code with the one-time transaction code; and
   ix) to make a successful identity verification if the verification code matches the one-time transaction code.

12. the system as claimed in claim 11, wherein each user is assigned a unique user identity.

13. The system as claimed in claim 12, wherein the computer system is configured to store each user identity in association with the users user access code.

14. The system as claimed in claim 11, wherein the input device is a touch screen.

15. The system as claimed in claim 11, wherein the input device is a pointer controlled h a mouse, trackball, trackpad, cursor keys or other, control device.

16. The system as claimed in claim 11, wherein the cells are displayed as a regular array of predetermined dimensions.

17. The system as claimed in claim 11, wherein the cells are displayed as an irregular array.

18. The system as claimed in claim 11, wherein the positions of the cells on the display are arranged differently on successive applications of the method.

19. The system as claimed in claim 11, wherein the display and input device are associated with a computer terminal in communication with a host computer to which the user wishes to gain access.

20. The system, as claimed in claim 19, wherein the host computer is configured to define the arrangement and content of the array of characters displayed on the display of the computer terminal.

* * * * *

UNITED STATES PATENT AND TRADEMARK OFFICE
CERTIFICATE OF CORRECTION

| | | |
|---|---|---|
| PATENT NO. | : 9,892,407 B2 | Page 1 of 1 |
| APPLICATION NO. | : 14/403001 | |
| DATED | : February 13, 2018 | |
| INVENTOR(S) | : Chris Russell | |

It is certified that error appears in the above-identified patent and that said Letters Patent is hereby corrected as shown below:

Column 9, Line 26, in Claim 1 please delete "2corresponding" and insert in its place --2 corresponding--.

Column 9, Lines 38-39, in Claim 1 please delete "topositional" and insert in its place --to positional--.

Column 9, Line 41, in Claim 1 after "input" please delete ",".

Column 9, Line 55, in Claim 3 after "claim" please insert --2--.

Column 9, Line 55, in Claim 3 please delete "compute" and insert in its place --computer--.

Column 9, Line 63, in Claim 6 please delete "ares" and insert in its place --are--.

Column 10, Line 38, in Claim 11 after "to" please delete ",".

Column 10, Line 53, in Claim 12 please delete "the" and insert --The--.

Column 10, Line 57, in Claim 12 please delete "users" and insert --user's--.

Column 10, Line 61, in Claim 15 please delete "h".

Column 11, Line 8, in Claim 20 after "system" please delete ",".

Signed and Sealed this
Fifteenth Day of May, 2018

Andrei Iancu
*Director of the United States Patent and Trademark Office*